(12) United States Patent
Papica et al.

(10) Patent No.: US 10,622,901 B2
(45) Date of Patent: Apr. 14, 2020

(54) LOW LOSS IC SELF SUPPLY

(71) Applicant: SEMICONDUCTOR COMPONENTS INDUSTRIES, LLC, Phoenix, AZ (US)

(72) Inventors: Petr Papica, Frenstat Pod Radhostem (CZ); Martin Podzemny, Lensa (CZ); Martin Kejhar, Roznov Pod Radhostem (CZ); Jakub Tomanek, Budejovice (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/366,810

(22) Filed: Mar. 27, 2019

(65) Prior Publication Data
US 2019/0393788 A1 Dec. 26, 2019

Related U.S. Application Data

(60) Provisional application No. 62/689,752, filed on Jun. 25, 2018.

(51) Int. Cl.
*H02M 3/335* (2006.01)
*H02M 1/36* (2007.01)
(Continued)

(52) U.S. Cl.
CPC ......... *H02M 3/33507* (2013.01); *H02M 1/32* (2013.01); *H02M 1/36* (2013.01); *H02M 2001/0032* (2013.01)

(58) Field of Classification Search
CPC .... H02M 3/22; H02M 3/335; H02M 3/33507; H02M 1/32; H02M 1/36; H02M 2001/0032
See application file for complete search history.

(56) References Cited

U.S. PATENT DOCUMENTS 9,837,917 B1 * 12/2017 Furtner ............ H02M 3/33523
2006/0002155 A1 * 1/2006 Shteynberg ......... H02M 1/4258
363/21.12
(Continued)

OTHER PUBLICATIONS

"Fixed Frequency Current Mode Controller for Flyback Converters," OnSemiconductor Publication Order No. NCP1237/D, Jul. 2011, 41 pages, Copyright 2011 Semiconductor Components Industries, LLC.

*Primary Examiner* — Adolf D Berhane
(74) *Attorney, Agent, or Firm* — Dickinson Wright PLLC; Mark E. Scott

(57) ABSTRACT

A power converter includes a primary controller having a control voltage terminal for receiving electrical power and a monitor terminal electrically coupled to an input sensing node with an input voltage varying periodically below a first start threshold voltage to define valleys. The power converter includes a first current source configured to drive a first electrical current from the monitor terminal to the control voltage terminal in response to the input voltage being less than the first start threshold voltage. A delay timer delays driving the first electrical current to center a supply time interval within a valley. A second current source drives a second electrical current from the monitor terminal to the control voltage terminal in response to the input voltage being less than a second start threshold voltage to reduce an impedance of the monitor terminal when the input voltage is in a valley.

19 Claims, 8 Drawing Sheets

(51) Int. Cl.
*H02M 1/32* (2007.01)
*H02M 1/00* (2006.01)

(56) References Cited

U.S. PATENT DOCUMENTS

| | | | | |
|---|---|---|---|---|
| 2007/0040516 | A1* | 2/2007 | Chen | H05B 39/045 |
| | | | | 315/291 |
| 2016/0111961 | A1* | 4/2016 | Balakrishnan | H02M 3/33507 |
| | | | | 363/21.12 |
| 2017/0033698 | A1* | 2/2017 | Vemuri | H02M 3/33592 |
| 2017/0288554 | A1* | 10/2017 | Fahlenkamp | H02M 1/08 |
| 2018/0054131 | A1* | 2/2018 | Lin | H02M 3/33507 |
| 2018/0084616 | A1* | 3/2018 | Kober | H05B 33/0815 |
| 2019/0013726 | A1* | 1/2019 | Podzemny | H02M 1/083 |

\* cited by examiner

LOW LOSS IC SELF SUPPLY

CROSS-REFERENCE TO RELATED APPLICATIONS

This application claims the benefit of U.S. Provisional Application Ser. No. 62/689,752 filed Jun. 25, 2018 titled "Circuits, Systems, and Methods for Low Loss." The provisional application is incorporated by reference herein as if reproduced in full below.

BACKGROUND

A primary controller for use within a power converter, such as a switched mode power supply (SMPS), uses a low-voltage electrical power supply to function. This low-voltage electrical power may be supplied to a control voltage terminal of the primary controller from an auxiliary supply, which may comprise an auxiliary winding of a transformer and a rectifying diode. The primary controller may also include a monitor terminal configured to monitor a voltage of alternating current (AC) electrical power supplied to the primary controller. In some cases, the auxiliary supply may not be able to supply sufficient power to maintain the control voltage terminal at a voltage sufficient to enable the primary controller to function.

BRIEF DESCRIPTION OF THE DRAWINGS

For a detailed description of example embodiments, reference will now be made to the accompanying drawings in which.

DEFINITIONS

Figure 1:
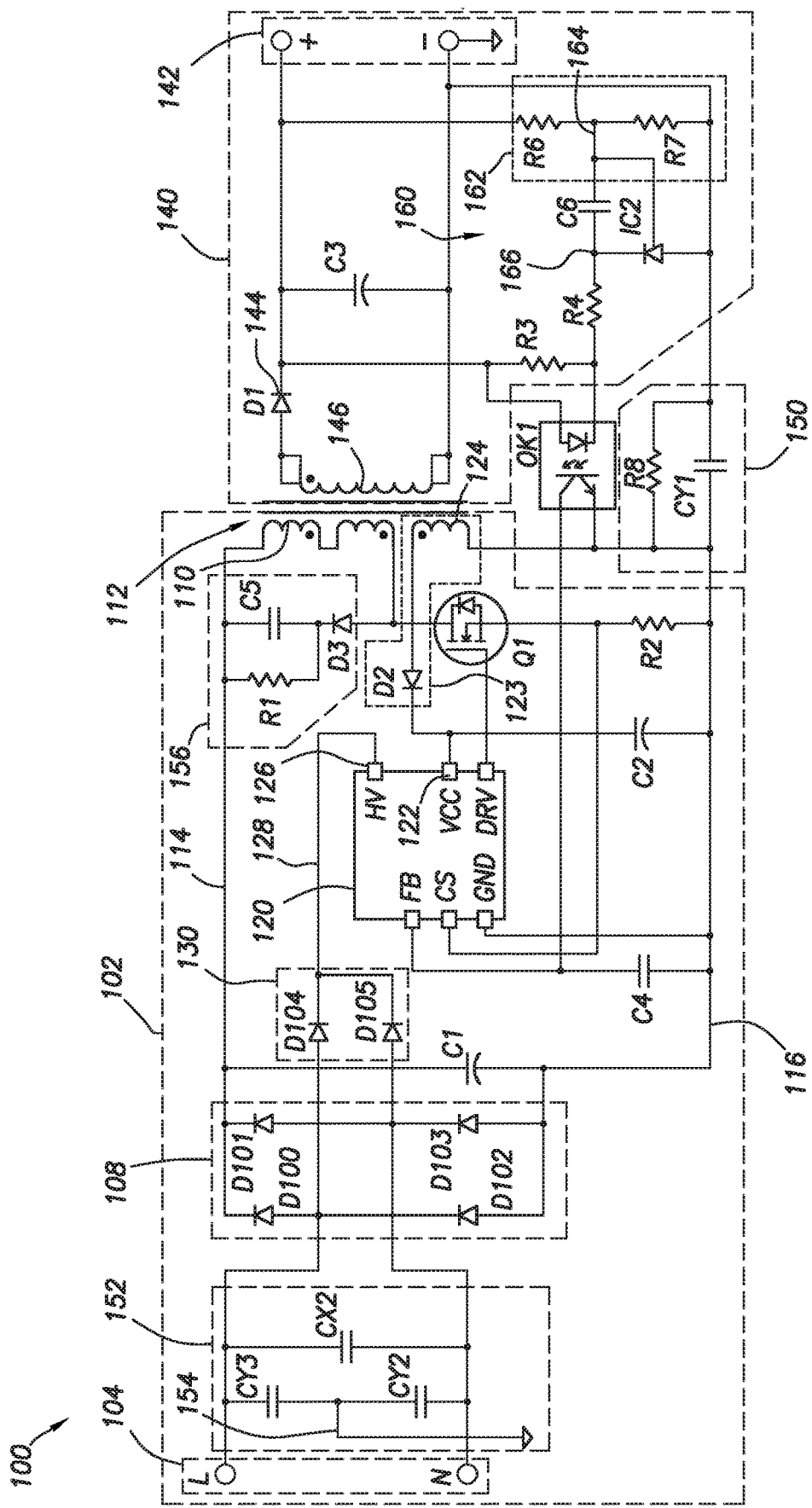
FIG. 1 shows a schematic diagram of a power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC) constructed on a substrate, a microcontroller constructed on a substrate (with or without controlling software stored on the substrate), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Power converters using an auxiliary supply to provide control power to a control voltage terminal of a primary controller suffer several drawbacks. For example, the auxiliary supply may not be able to supply sufficient power to maintain the control voltage terminal at a voltage sufficient to enable the primary controller to function. Related art solutions to supplement the power supplied to the control voltage terminal suffer drawbacks as well. Such related art solutions may draw upon a high-voltage monitor terminal of the primary controller, which may cause the control voltage terminal and circuitry connected thereto, to be constructed using a more costly process capable of withstanding higher voltages such as, for example, 80 Volts. The system and method of the present disclosure provides supplemental electrical power to the control voltage terminal from a high-voltage monitor terminal of the primary controller while the input voltage of the high-voltage monitor terminal is in a valley, having a relatively low voltage. The system and method of the present disclosure also provides for the high-voltage monitor terminal to have a reduced impedance while the input voltage of the high-voltage monitor terminal is in a valley, thereby enabling a more accurate measurement of the input voltage while also providing energy efficiency as a result of the high-voltage monitor terminal having a larger impedance value when the input voltage of the high-voltage monitor terminal is relatively high.

FIG. 1 shows an electrical schematic diagram of a power converter 100 in accordance with at least some embodiments. In particular, the power converter 100 comprises a primary side 102 for acting upon an incoming alternating current (AC) electrical power. The primary side 102 comprises an AC input 104 including a line terminal L and a neutral terminal N for receiving the incoming AC electrical power, which may be received from an AC source, such as a utility line or a household receptacle. The AC input 104 is electrically coupled to an input power rectifier 108 to provide a DC input power to a primary winding 110 of a transformer 112. More specifically, the input power rectifier 108 provides the DC input power to a rectified input node 114 and an input reference node 116, which ultimately provide the DC input power to the primary winding 110 of the transformer 112. In at least some embodiments, and as shown in FIG. 1, the input power rectifier 108 includes four power rectifier diodes D100, D101, D102, D103 configured as a full-bridge rectifier, but other rectifier arrangements may be used (e.g. half-bridge). In the example system of FIG. 1, an electrically-controlled switch Q1 is configured to selectively provide or interrupt electrical current from flowing through the primary winding 110 between the rectified input node 114 and the input reference node 116. The electrically-controlled switch Q1 may take any suitable form (e.g. a field effect transistor (FET) as shown, or a bipolar junction transistor), and is hereafter referred as just switching device Q1.

In accordance with at least some embodiments, the primary side 102 of the power converter 100 also comprises a primary controller 120 to coordinate the operation of the power converter 100. In the example system of FIG. 1, the primary controller 120 defines a control voltage terminal 122 for receiving a low-voltage electrical power used to power the primary controller 120 to function. A control voltage capacitor C2 may be connected between the control voltage terminal 122 and the input reference node 116 for maintaining the voltage upon the control voltage terminal 122 of the primary controller 120. The control voltage terminal 122 is supplied with electrical power by an auxiliary supply 123, which in the example system comprises an auxiliary winding 124 of the transformer 112 and a rectifying diode D2, which performs a half-bridge rectification. In other words, the auxiliary supply 123 provides a DC current to the control voltage capacitor C2 and the control voltage terminal 122 of the primary controller 120.

In the example system of FIG. 1, the switching device Q1 may be controlled by a drive output DRV of the primary controller 120. A first shunt resistor R2 may be connected in series with the electrically-controlled switch Q1 to produce a current-sensing voltage across the first shunt resistor R2. The first shunt resistor R2 may be electrically connected to a current sense input CS of the primary controller 120, thereby enabling the primary controller 120 to monitor the current through the electrically-controlled switch Q1.

In the example system of FIG. 1, an input rectifier 130 includes two input rectifier diodes D104, D105 electrically connected between corresponding ones of the line terminal L and the neutral terminal N and an input sensing node 128 to provide the input voltage $V_{HV}$ upon the input sensing node 128. More specifically, the input voltage $V_{HV}$ generated by the input rectifier 130 corresponds to the rectified voltage of the incoming AC electrical power on the AC input 104 and varies periodically below a first start threshold voltage $V_{HV\_I1(on)}$. Examples of the periodic input voltage $V_{HV}$ are shown graphically in the timing diagrams of FIGS. 5-7, discussed in greater detail below. In accordance with at least some embodiments, the primary controller 120 also includes a monitor terminal 126 electrically coupled to the input sensing node 128 enabling the primary controller 120 to monitor the input voltage $V_{HV}$. The primary controller 120 is, therefore, able to monitor the voltage of the incoming AC electrical power via the monitor terminal 126.

A snubber network 156 may be connected across the primary winding 110 of the transformer 112 to dissipate transient high-voltage that may be generated by a collapsing magnetic field when the switching device Q1 interrupts electrical current from flowing through the primary winding 110. As shown in FIG. 1, the snubber network 156 may include a snubber resistor R1 and a snubber capacitor C5 connected in series with one another. The snubber network 156 may also include a snubber diode D3 connected in series with both of the snubber resistor R1 and the snubber capacitor C5. The snubber diode D3 may be connected to block electrical current from flowing through the snubber network 156 during normal operation with electrical current flowing through the primary winding 110. The snubber diode D3 may become conductive when subjected to voltage having a polarity opposite that experienced during normal operation. In other words, the snubber diode D3 causes the snubber network 156 to conduct electrical current only when subjected to reverse-biased electromotive force (EMF), also called back-EMF, such as the transient high-voltage that may be generated by the collapsing magnetic field in the primary winding 110.

In accordance with at least some embodiments, the power converter 100 also comprises a secondary side 140 configured to provide an output power to a direct current (DC) output 142 including a positive output terminal+ and a negative output terminal−. In the example system of FIG. 1, the secondary side 140 comprises a secondary rectifier 144 electrically connected between a secondary winding 146 of the transformer 112 and the positive output terminal+ of the DC output 142. In the example system of FIG. 1, the secondary rectifier 144 comprises a single diode D1; however, in other cases the secondary rectifier 144 may take other forms. For example, the secondary rectifier 144 may be a synchronous rectifier in the form of an electrically controlled switch driven by a second side controller. As shown, the secondary winding 146 of the transformer 112 is configured for flyback operation. In the example system of FIG. 1, an output capacitor C3 is connected between the positive and negative output terminals+, − of the the DC output 142 to reduce ripple in the output voltage.

In accordance with at least some embodiments, the power converter 100 may comprise a feedback circuit 160 providing a feedback signal for the primary controller 120 to monitor the operation of the secondary side 140 and to control the voltage of the DC output 142. In the example system of FIG. 1, the feedback circuit 160 includes a first voltage divider 162 including two first resistors R6, R7 connected in series between the positive and negative output terminals+, − of the DC output 142. The first voltage divider 162 defines an intermediate node 164 between the two first resistors R6, R7, with the intermediate node 164 having a first fractional voltage that is a predetermined fraction of the voltage of the DC output 142. The predetermined fraction depends on the relative values of the first resistors R6, R7 within the voltage divider 162. A shunt regulator IC2 is connected between the negative output terminal− and a regulated node 166 with a reference input connected to the intermediate node 164 to maintain the regulated node 166 at a regulated voltage that is proportional to the voltage on the intermediate node. A feedback capacitor C6 may be connected between the intermediate node 164 and the regulated node 166 for stabilizing the voltage on the regulated node 166.

In the example system of FIG. 1, the feedback circuit 160 includes an optocoupler OK1 comprising a light emitting diode (LED) and a light-sensitive switch. A second shunt resistor R3 and a series resistor R4 are connected in series between the regulated node 166 and the positive output terminal+ of the DC output 142. The LED of the optocoupler OK1 is connected across the second shunt resistor R3 and illuminates to activate the light-sensitive switch when the output of the secondary rectifier 144 is above a predetermined voltage threshold. In the example system of FIG. 1, the light-sensitive switch of the optocoupler OK1 is electrically connected to a feedback input FB of the primary controller 120. The optocoupler OK1, therefore, may allow the primary controller 120 to monitor the operation of the secondary side 140 while being electrically isolated therefrom. In some embodiments, a holding capacitor C4 is connected between the feedback input FB of the primary controller 120 and the input reference node 116. The holding capacitor C4 maintains a voltage upon the feedback input FB after the light-sensitive switch is de-activated. The holding capacitor C4 may, therefore, allow the primary controller 120 to sense an activation of the optocoupler OK1 that would otherwise be too fast to be sensed.

In accordance with at least some embodiments, the power converter 100 may include a decoupler 150 disposed between the primary side 102 and the secondary side 140 to provide electrical isolation and to reduce interference from being transmitted therebetween. More specifically, and as shown in FIG. 1, the decoupler 150 may include a decoupler capacitor CY1 electrically connected between the input reference node 116 and the negative output terminal- of the DC output 142. The decoupler 150 may include a bleed-off resistor R8 to discharge any residual voltage from the decoupler capacitor CY1 after power is removed from the power converter 100. In some embodiments, the bleed-off resistor R8 may have a relatively high resistance to reduce energy loss resulting from current flowing during normal operation.

Still referring to FIG. 1, the power converter 100 may further include an input filter 152 electrically connected between the line terminal L and the neutral terminal N of the AC input 104. More specifically, and as shown in FIG. 1, the input filter 152 may include first filter capacitors CY2, CY3 each electrically connected between a common node 154, such as a ground node, and corresponding one of the line terminal L and the neutral terminal N. Additionally or alternatively, the input filter 152 may include a second filter capacitor CX2 electrically connected between the line terminal L and the neutral terminal N of the AC input 104. The input filter 152 may function to reduce electromagnetic interference from being transmitted between the power converter 100 and a line source connected to the AC input 104 by suppressing any transient voltages on either or both of the line terminal L and/or the neutral terminal N of the AC input 104.

Figure 2:
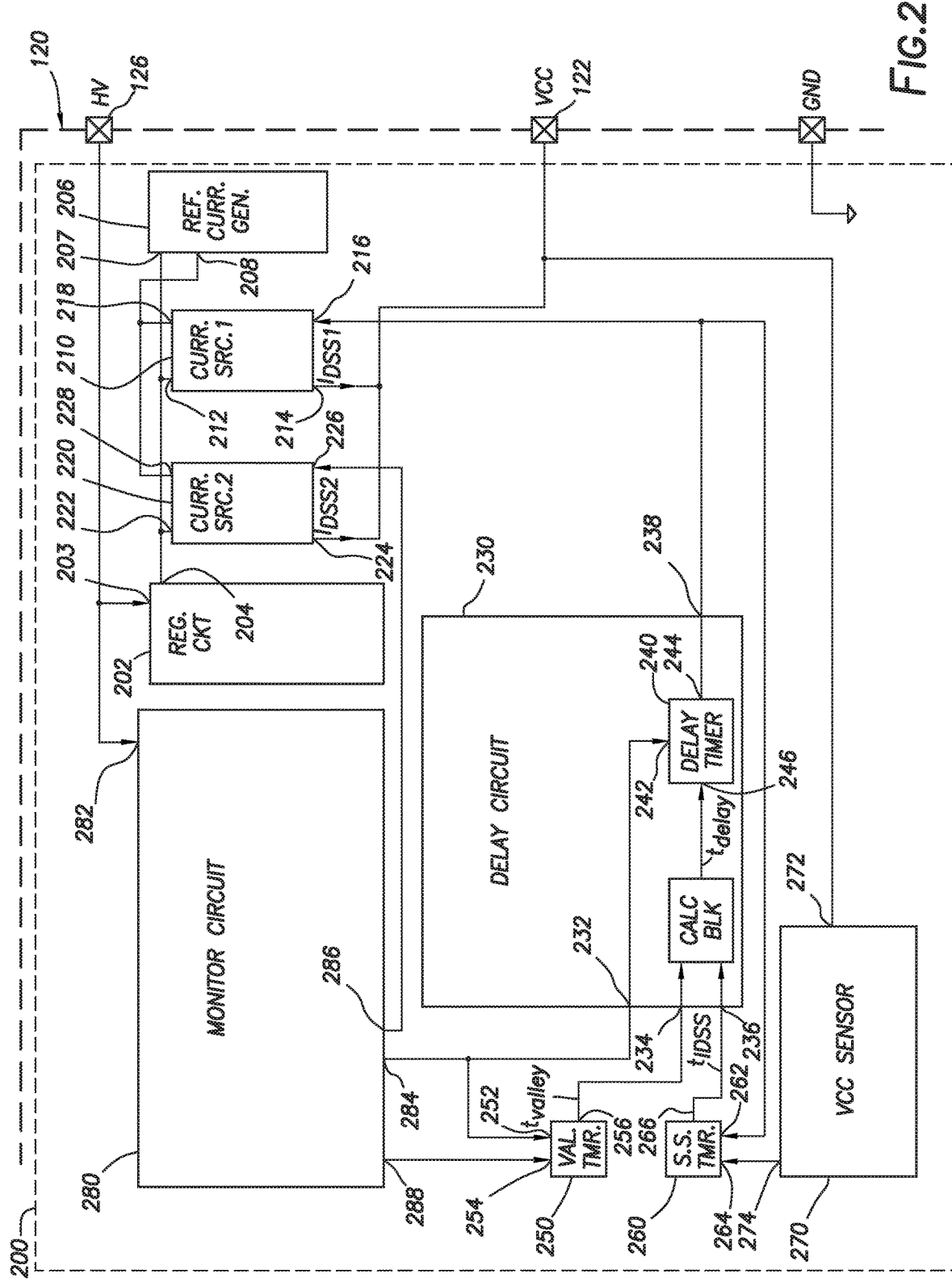
FIG. 2 shows a block diagram of a primary controller in accordance with at least some embodiments.

FIG. 2 shows a partial block diagram of a primary controller 120 in accordance with at least some embodiments. The primary controller 120 of the power converter 100 comprises the control voltage terminal 122 for being energized with a control voltage $V_{CC}$ to power the primary controller 120. The primary controller 120 also comprises the monitor terminal 126 for monitoring an input voltage $V_{HV}$ which is supplying the power converter 100.

The primary controller 120 shown in FIG. 2 also includes a supplemental power controller 200 configured to provide electrical power to the control voltage terminal 122 from the monitor terminal 126. In other words, the supplemental power controller 200 may provide electrical power to charge the control voltage capacitor C2 (FIG. 1) and/or to run the primary controller 120 when the auxiliary supply 123 (FIG. 1) is unable to provide a sufficient amount of DC current to run the primary controller 120 and to charge the control voltage capacitor C2.

In accordance with at least some embodiments, the supplemental power controller 200 includes a regulator circuit 202 having a regulator input 203 and a regulator output 204. The regulator input 203 is in electrical communication with the monitor terminal 126 for receiving electrical current to produce a regulated voltage on the regulator output 204. The supplemental power controller 200 also includes a reference current generator 206 having a reference generator input 207 and a reference current output 208.

The reference generator input 207 is electrically connected to the regulator output 204 of the regulator circuit 202 for receiving electrical power therefrom. The reference generator 206 is configured to provide a regulated and constant electrical current to the reference current output 208.

In accordance with at least some embodiments, the supplemental power controller 200 includes a first current source 210 configured to drive a first electrical current $I_{DSS1}$ from the monitor terminal 126 to the control voltage terminal 122 in response to the input voltage $V_{HV}$ being less than the first start threshold voltage $V_{HV\_I1(on)}$. The first electrical current $I_{DSS1}$ may be used by the primary controller 120, for example to provide electrical power to operate one or more circuits therein. Alternatively or additionally, the first electrical current $I_{DSS1}$ may operate to charge the control voltage capacitor C2 (FIG. 1). In one example embodiment, the first electrical current $I_{DSS1}$ may be 33 milliamp (mA). In another example embodiment, the first electrical current $I_{DSS1}$ may be 38 mA.

Driving the first electrical current $I_{DSS1}$ from the monitor terminal 126 to the control voltage terminal 122 when the input voltage $V_{HV}$ is less than the first start threshold voltage $V_{HV\_I1(on)}$ may reduce the cost of construction. For example, the circuitry connected to the control voltage terminal 122 may not need to withstand the higher voltage levels that may be present on the monitor terminal 126. The circuitry connected to the control voltage terminal 122 may, therefore, have a less costly construction than if it had to withstand higher voltages. For example, using the above-described method, the circuitry connected to the control voltage terminal 122 may be constructed using a silicon process rated for 40 Volts, where an alternative design that always supplied current from the monitor terminal 126, may require the circuitry connected to the control voltage terminal 122 to be constructed using a more costly process capable of withstanding higher voltages such as, for example, 80 Volts.

In accordance with at least some embodiments, and as shown in FIG. 2, the first current source 210 includes a first current input 212, a first current output 214, a first control input 216, and a first current reference input 218. The first current input 212 is electrically connected to the regulator output 204 of the regulator circuit 202 to supply the first current source 210 with the first electrical current $I_{DSS1}$ from the monitor terminal 126. The first current source 210 is configured to output the first electrical current $I_{DSS1}$ from the first current output 214 in response to assertion of the first control input 216. The first current source 210 is configured to regulate the amount of the first electrical current $I_{DSS1}$ using the first current reference input 218.

In accordance with at least some embodiments, and as shown in FIG. 2, a second current source 220 includes a second current input 222, a second current output 224, a second control input 226, and a second current reference input 228. The second current input 222 is electrically connected to the regulator output 204 of the regulator circuit 202 to supply the second current source 220 with the second electrical current $I_{DSS2}$ from the monitor terminal 126. The second current source 220 is configured to output the second electrical current $I_{DSS2}$ from the second current output 224 in response to assertion of the second control input 226. The second current source 220 is configured to regulate the amount of the second electrical current $I_{DSS2}$ using the second current reference input 228. In accordance with at least some embodiments, the second electrical current $I_{DSS2}$ is less than the first electrical current $I_{DSS1}$, and provides the beneficial result of reducing the effective impedance of the monitor terminal 126 when the input voltage $V_{HV}$ is in a valley. The reduced impedance of the monitor terminal 126 thereby limits the fluctuation of the input voltage $V_{HV}$ on the monitor terminal 126, enabling the primary controller 120 to more accurately measure the DC input voltage or rectified AC input voltage upon the rectified input node 114 and the input reference node 116. In one example embodiment, the second electrical current $I_{DSS2}$ may be 500 micro amps (μA).

The supplemental power controller 200 may also include a delay circuit 230 configured to delay the driving of the first electrical current $I_{DSS1}$ by the first current source 210. More specifically, and as shown in FIG. 2, the delay circuit 230 includes a first delay input 232, a second delay input 234, a third delay input 236, and a delay output 238, with the delay output 238 being connected the first control input 216 of the first current source 210. The delay circuit 230 includes a delay timer 240 having a delay trigger input 242 and a timer output 244 and a delay setting input 246. The delay timer 240 is configured to monitor the delay trigger input 242, to wait for a delay time $t_{delay}$ after assertion of the delay trigger input 242, and to assert the timer output 244 after the delay time $t_{delay}$ has elapsed. In some embodiments, and as shown in FIG. 2, the timer output 244 is connected to the first control input 216 of the first current source 210, thereby providing for the delay timer 240 delay assertion of the first control input 216 of the first current source 210 for the delay time $t_{delay}$ after the delay trigger input 242 is asserted. In some embodiments, the delay timer 240 may be configured to modify the length of the delay time in response to one or more signals provided upon the delay setting input 246.

The supplemental power controller 200 may also include a valley timer 250 including a first valley trigger input 252 and a second valley trigger input 254 and a valley time output 256. The valley timer 250 may be configured to determine a valley time $t_{valley}$ as the length of time from the input voltage $V_{HV}$ dropping below the first start threshold voltage $V_{HV\_I1(on)}$ until the input voltage $V_{HV}$ is less than a reference voltage $V_{HV(min)}$. This is illustrated graphically in the timing diagram of FIG. 6, discussed more below. More specifically, and as shown in FIG. 2 the valley timer 250 is configured to monitor the valley trigger inputs 252, 254 to determine the valley time $t_{valley}$ between assertion of the first valley trigger input 252 (corresponding to the input voltage $V_{HV}$ dropping below the first start threshold voltage $V_{HV\_I1 (on)}$) until assertion of the second valley trigger input 254 (corresponding to the input voltage $V_{HV}$ being less than the reference voltage $V_{HV(min)}$) and to output a signal upon the valley time output 256 corresponding to the valley time $t_{valley}$. In some embodiments, and as shown in FIG. 2, the valley time output 256 is connected to the second delay input 234 of the delay circuit 230, providing the valley time $t_{valley}$ to the delay circuit 230.

The supplemental power controller 200 may also include a switched supply timer 260 including a first switched supply trigger input 262, a second switched supply trigger input 264, and a switched supply time output 266. The switched supply timer 260 may be configured to determine a supply time interval $t_{IDSS}$ as the length of time from assertion of the first switched supply trigger input 262 until assertion of the second switched supply trigger input 264. In some embodiments, and as shown in FIG. 2, the first switched supply trigger input 262 is connected to the first control input 216 of the first current source 210, which is asserted to drive the first electrical current $I_{DSS1}$, and the second switched supply trigger input 264 is configured to be asserted in response to the control voltage $V_{CC}$ exceeding a first control voltage threshold $V_{CC(on)}$. In other words, the switched supply timer 260 may record the supply time interval $t_{IDSS}$ that the control voltage capacitor C2 (FIG. 1) is charged by the first electrical current $I_{DSS1}$ by measuring the length of time while the first electrical current $I_{DSS1}$ is driven and while the control voltage $V_{CC}$ is less than the first control voltage threshold $V_{CC(on)}$.

The supplemental power controller 200 may also include a control voltage sensor 270 including a voltage sensor input 272 and a voltage sensor output 274, with the voltage sensor input 272 connected to the control voltage terminal 122. The control voltage sensor 270 may be configured to measure a control voltage $V_{CC}$ on the control voltage terminal 122 and to assert the voltage sensor output 274 in response to the control voltage $V_{CC}$ exceeding a predetermined value. In some embodiments, and as shown in FIG. 2, the voltage sensor output 274 may be connected to the second switched supply trigger input 264 of the switched supply timer 260 to assert the second switched supply trigger input 264 in response to the control voltage $V_{CC}$ exceeding the first control voltage threshold $V_{CC(on)}$.

In some embodiments, and as shown in FIG. 2, the supplemental power controller 200 may also include a monitor circuit 280 including a monitor input 282 connected to the monitor terminal 126 for monitoring the input voltage $V_{HV}$. The monitor circuit 280 may also include a first monitor output 284, a second monitor output 286, and a third monitor output 288. The monitor circuit 280 is configured to assert each of the monitor outputs 284, 286, 288 independently in response to the input voltage $V_{HV}$ being below predetermined values associated with each of the monitor outputs 284, 286, 288.

More specifically, and as shown in FIG. 2, the first monitor output 284 is connected to the delay trigger input 242 of the delay timer 240 via the first delay input 232 of the delay circuit 230, and the monitor circuit 280 is configured to assert the first monitor output 284 when the input voltage $V_{HV}$ is less than a first start threshold voltage $V_{HV\_I1(on)}$. This configuration provides for the delay timer 240 to begin timing in response to the input voltage $V_{HV}$ being less than the first start threshold voltage $V_{HV\_I1(on)}$. In other words, the delay timer 240 delays driving the first electrical current $I_{DSS1}$ for a period of time $t_{delay}$ after the input voltage $V_{HV}$ drops below the first start threshold voltage $V_{HV\_I1(on)}$. In some embodiments, the first monitor output 284 is also connected to the first valley trigger input 252 of the valley timer 250.

In some embodiments, and as also shown in FIG. 2 the second monitor output 286 is connected to the second control input 226 of the second current source 220, and the monitor circuit 280 is configured to assert the second monitor output 286 when the input voltage $V_{HV}$ is less than a second start threshold voltage $V_{HV\_I2(on)}$, which in example embodiments is higher than the first start threshold voltage $V_{HV\_I1(on)}$. Additionally, the third monitor output 288 is connected to the second valley trigger input 254 of the valley timer 250, and the monitor circuit 280 is configured to assert the third monitor output 288 when the input voltage $V_{HV}$ is below a reference voltage $V_{HV(min)}$. This configuration may allow the valley timer 250 to stop timing with the input voltage $V_{HV}$ at or near the local minimum (discussed more with respect to FIGS. 4 and 7 below). The reference voltage $V_{HV(min)}$ may be an expected minimum value of the input voltage $V_{HV}$. The reference voltage $V_{HV(min)}$ may be slightly larger than the expected minimum value of the input voltage $V_{HV}$ to ensure that the valley is reliably detected for each period. In one embodiment, the input voltage $V_{HV}$ periodically drops to a value of about 0.0 V in each valley, and the reference voltage $V_{HV(min)}$ is 5.0 V.

Figure 3:
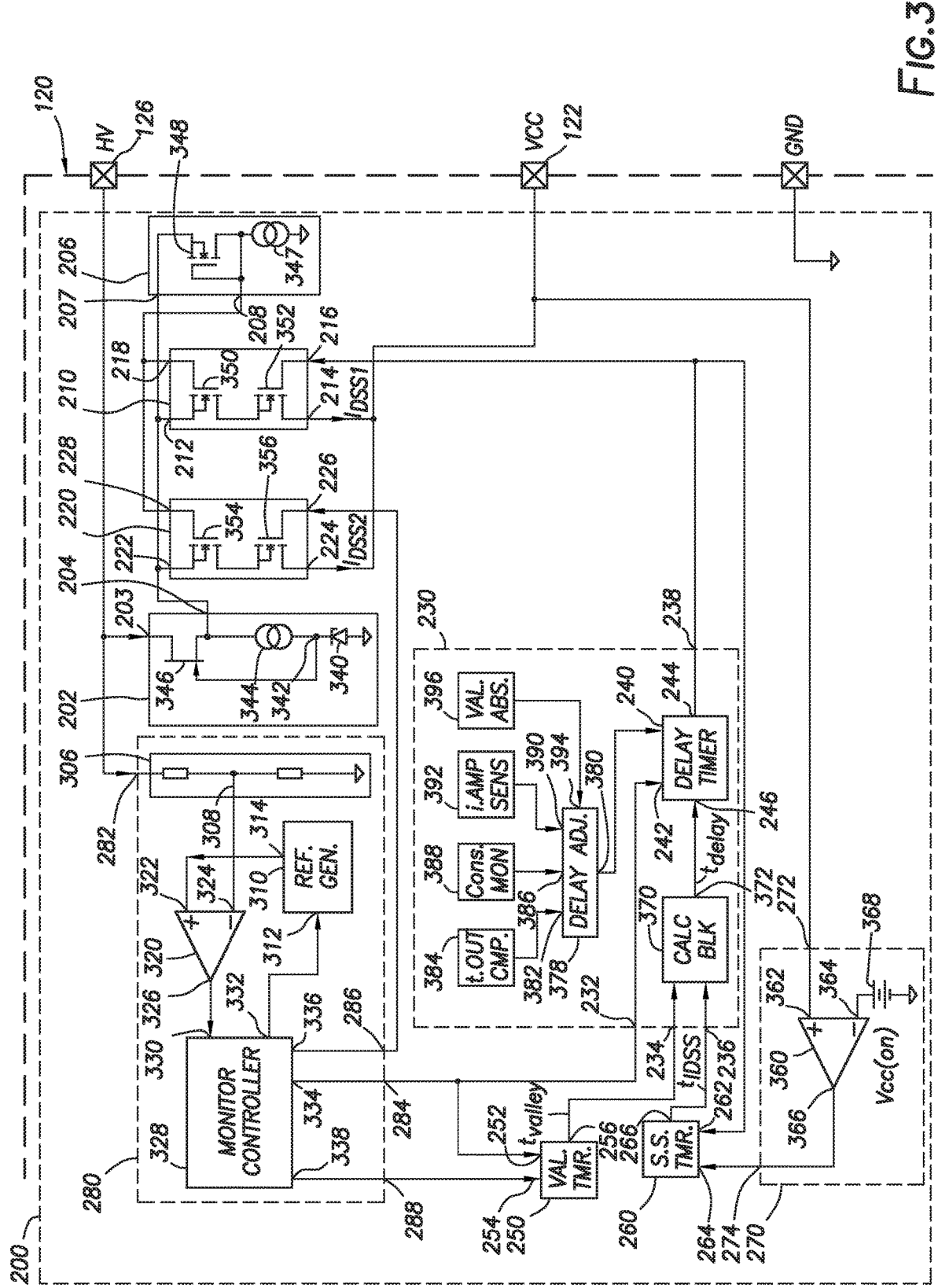
FIG. 3 shows a partial schematic diagram, partial block diagram, of a primary controller in accordance with at least some embodiments.

FIG. 3 shows a partial schematic diagram, partial block diagram, of a primary controller 120 in accordance with at least some embodiments. More specifically, FIG. 3 shows the partial block diagram of FIG. 2, with additional details.

In the embodiment shown in FIG. 3, the monitor circuit 280 includes a second voltage divider 306 having two resistors connected in series between the monitor input 282 and a ground plane having a defined reference, such as 0V, to define a monitor node 308 between the resistors of the second voltage divider 306. The second voltage divider 306 functions to energize the monitor node 308 with a voltage that is a predetermined fraction of the input voltage $V_{HV}$ on the monitor terminal 126, where the predetermined fraction depends on the relative values of the resistors within the second voltage divider 306. The resistors of the second voltage divider 306 each have a relatively high resistance value, which may be greater than 1 Mega-Ohm (MΩ), to provide a relatively high impedance on the monitor input 282, thereby reducing electrical current flowing into the monitor circuit 280 from the monitor terminal 126, while enabling the monitor circuit 280 to measure the input voltage $V_{HV}$ on the monitor terminal 126.

In some embodiments, and as shown in FIG. 3, the monitor circuit 280 also includes a reference generator 310, which includes a reference input 312 and a reference output 314. The reference generator 310 is configured to generate reference voltage upon the reference output 314 based upon a command signal applied to the reference input 312. The monitor circuit 280 also includes a monitor comparator 320 having a non-inverting input 322 and an inverting input 324 and a comparison output 326. The monitor comparator 320 may be configured to assert the comparison output 326 in response to the voltage on the non-inverting input 322 exceeding the voltage on the inverting input 324. As shown in FIG. 3, the non-inverting input 322 is connected to the reference output 314 of the reference generator 310, and the inverting input 324 is connected to the monitor node 308. The monitor comparator 320 may be implemented using an operational amplifier (op-amp) as shown. However, in other cases the monitor comparator 320 may take other forms. The monitor comparator 320 may include other inputs (not shown), such as inputs for power and ground.

In some embodiments, and as shown in FIG. 3, the monitor circuit 280 also includes a monitor controller 328 having a controller input 330 and a command output 332 and a first controller output 334 and a second controller output 336 and a third controller output 338. The monitor controller 328 is configured to output a range of values to the command output 332 and to simultaneously monitor the controller input 330 to determine if the voltage on the reference output 314 of the reference generator 310 exceeds the voltage of the monitor node 308. By outputting a range of different voltages on the command output 332, the monitor circuit 280 is able to measure the voltage of the monitor node 308. The monitor circuit 280 may also, therefore, measure the input voltage $V_{HV}$.

The monitor controller 328 may also be configured to assert the various controller outputs 334, 336, 338 in response to the input voltage $V_{HV}$ having specific associated values or ranges of values. The first controller output 334 is connected to the first monitor output 284 of the monitor circuit 280, thereby providing for the monitor controller 328 to assert the first monitor output 284 when the input voltage $V_{HV}$ is less than the first start threshold voltage $V_{HV\_I1(on)}$. Likewise, the second controller output 336 is connected to the second monitor output 286, thereby providing for the monitor controller 328 to assert the second monitor output 286 when the input voltage $V_{HV}$ is less than the second start threshold voltage $V_{HV\_I2(on)}$. Similarly, the third controller output 338 is connected to the third monitor output 288, thereby providing for the monitor controller 328 to assert the third monitor output 288 when the input voltage $V_{HV}$ is below the reference voltage $V_{HV}$(min).

In accordance with at least some embodiments, and as also shown in FIG. 3, the regulator circuit 202 includes a zener diode 340 connected between the ground plane and a first reference node 342 for maintaining a predetermined voltage upon the first reference node 342. A first biasing current supply 344 is connected between the first reference node 342 and the regulator output 204. A regulator transistor 346 includes a gate terminal connected to the first reference node 342, a source terminal connected to the regulator output 204, and a drain terminal connected to the regulator input 203. The regulator transistor 346, therefore, functions to produce the regulated voltage on the regulator output 204 and is regulated by the combination of the zener diode 340 and the first biasing current supply 344. In some example embodiments, the regulator transistor 346 is an n-channel junction gate field-effect transistor (n-JFET), as shown in FIG. 3. However, in other cases the regulator transistor 346 may take other forms, such as another type of field effect transistor (FET) or as a bipolar junction transistor (BJT).

In accordance with at least some embodiments, and as also shown in FIG. 3, the reference current generator 206 includes a second biasing current supply 347 connected between the ground plane and the reference current output 208. The reference current generator 206 may also include a current reference transistor 348 with a source terminal connected to the reference generator input 207 and with a gate terminal and a drain terminal each connected together and to the reference current output 208. In some example embodiments, and as shown in FIG. 3, current reference transistor 348 is an enhancement-mode p-type metal-oxide-semiconductor field-effect transistor (P-MOSFET). However, in other cases the current reference transistor 348 may take other forms, such as another type of field effect transistor (FET) or as a bipolar junction transistor (BJT).

In accordance with at least some embodiments, and as also shown in FIG. 3, the first current source 210 includes a first current regulating transistor 350 having a source terminal connected to the first current input 212, which is connected to receive electrical current from the regulator output 204 of the regulator circuit 202. The source terminal of the first current regulating transistor 350 is also connected to the source terminal of the current reference transistor 348 within the reference current generator 206. The first current regulating transistor 350 may also have a gate terminal connected to the first current reference input 218, which is connected to the gate terminal of the current reference transistor 348 within the reference current generator 206. When connected as indicated, with equivalent gate-source voltages, the current reference transistor 348 and the first current regulating transistor 350 together form a "current mirror" that drives the source-drain current of the first current regulating transistor 350 to the predetermined first electrical current $I_{DSS1}$, which is directly proportional to the source-drain current of the current reference transistor 348 (i.e., the current through the second biasing current supply 347). In some example embodiments, and as shown in FIG. 3, the first current regulating transistor 350 is an enhancement-mode p-type metal-oxide-semiconductor field-effect transistor (P-MOSFET). However, in other cases the first current regulating transistor 350 may take other forms, such as another type of field effect transistor (FET) or as a bipolar junction transistor (BJT).

In at least some embodiments, the first current source 210 also includes a first switching transistor 352, which is configured to selectively switch the first electrical current $I_{DSS1}$ in response to assertion of the first control input 216. More specifically, and as shown in FIG. 3, the first switching transistor 352 may be an enhancement-mode p-type metal-oxide-semiconductor field-effect transistor (p-MOSFET) with its source terminal connected to the drain terminal of the first current regulating transistor 350, and with its drain and gate terminals connected to the first current output 214 and the first control input 216 of the first current source 210, respectively. However, in other cases the first switching transistor 352 may take other forms, such as another type of field effect transistor (FET) or as a bipolar junction transistor (BJT).

In accordance with at least some embodiments, and as also shown in FIG. 3, the second current source 220 includes a second current regulating transistor 354 having a source terminal connected to the second current input 222, which is connected to receive electrical current from the regulator output 204 of the regulator circuit 202. The source terminal of the second current regulating transistor 354 is also connected to the source terminal of the current reference transistor 348 within the reference current generator 206. The second current regulating transistor 354 may also have a gate terminal connected to the second current reference input 228, which is connected to the gate terminal of the current reference transistor 348 within the reference current generator 206. When connected as indicated, with equivalent gate-source voltages, the current reference transistor 348 and the second current regulating transistor 354 together form a "current mirror" that drives the source-drain current of the second current regulating transistor 354 to the predetermined second electrical current $I_{DSS2}$, which is directly proportional to the source-drain current of the current reference transistor 348 (i.e., the current through the second biasing current supply 347). In some example embodiments, and as shown in FIG. 3, the second current regulating transistor 354 is an enhancement-mode p-type metal-oxide-semiconductor field-effect transistor (P-MOSFET). However, in other cases the second current regulating transistor 354 may take other forms, such as another type of field effect transistor (FET) or as a bipolar junction transistor (BJT). In some embodiments, the second electrical current $I_{DSS2}$ may be different from the first electrical current $I_{DSS1}$ due to physical differences between the second current regulating transistor 354 and the first current regulating transistor 350.

In at least some embodiments, the second current source 220 also includes a second switching transistor 356, which is configured to selectively switch the second electrical current $I_{DSS2}$ in response to assertion of the second control input 226. More specifically, and as shown in FIG. 3, the second switching transistor 356 may be an enhancement-mode p-type metal-oxide-semiconductor field-effect transistor (p-MOSFET) with its source terminal connected to the drain terminal of the second current regulating transistor 354, and with its drain and gate terminals connected to the second current output 224 and the second control input 226 of the second current source 220, respectively. However, in other cases the second switching transistor 356 may take other forms, such as another type of field effect transistor (FET) or as a bipolar junction transistor (BJT).

In some embodiments, and as shown in FIG. 3, the control voltage sensor 270 includes a control voltage (CV) comparator 360 having a non-inverting input 362 and an inverting input 364 and a CV comparison output 326. The control voltage comparator 360 may be configured to assert the comparison output 366 in response to the voltage on the non-inverting input 362 exceeding the voltage on the inverting input 364. As shown in FIG. 3, the non-inverting input 362 is connected to the control voltage terminal 122 via the voltage sensor input 272. A threshold voltage supply 368 is connected between the ground plane and the inverting input 364 to drive the inverting input 364 to the first control voltage threshold $V_{CC(on)}$. In other words, the control voltage (CV) comparator 360 is configured to assert the voltage sensor output 274 in response to the control voltage $V_{CC}$ exceeding the first control voltage threshold $V_{CC(on)}$. The control voltage comparator 360 may be implemented using an operational amplifier (op-amp) as shown. However, in other cases the control voltage comparator 360 may take other forms. The control voltage comparator 360 may include other inputs (not shown), such as inputs for power and ground.

In some embodiments, and as shown in FIG. 3, the delay circuit 230 includes a calculation block 370 having a calculation output 372 and two inputs connected to the second and third delay inputs 234, 236. The calculation block 370 may be configured to calculate the setting for the delay time $t_{delay}$ based upon the valley time $t_{valley}$ and the supply time interval $t_{IDSS}$. The calculation block 370 may be configured to transmit the delay time $t_{delay}$ to the delay timer 240 via the calculation output 372, which is connected to the delay setting input 246 of the delay timer 240. Furthermore, and in accordance with at least some embodiments, the delay time $t_{delay}$ may be set to be the valley time $t_{valley}$ minus one-half of the supply time interval $t_{IDSS}$. This setting of delay time $t_{delay}$ functions to center the supply time interval $t_{IDSS}$ about the reference voltage $V_{HV(min)}$, with half of the supply time interval $t_{IDSS}$ before the input voltage $V_{HV}$ is at its minimum value, and with half of the supply time interval $t_{IDSS}$ thereafter.

In accordance with at least some embodiments, and as shown in FIG. 3, the delay circuit 230 of the supplemental power controller 200 may further comprise a delay time adjustor 378 having a delay adjustment output 380, coupled to the delay timer 240 and configured to change the length of the delay time $t_{delay}$ between assertion of the delay trigger input 242 until the delay timer 240 asserts the timer output 244. The delay time adjustor 378 may include one or more of a first adjuster input 382, a second adjuster input 386, a third adjuster input 390, and a fourth adjuster input 394, with the delay time adjustor 378 configured to cause to change the length of the delay time $t_{delay}$ by signaling the delay timer 240 via the delay adjustment output 380 in response to assertion of any of the adjuster inputs 382, 386, 390, 394. The delay time adjustor 378 may be configured to cause to change the length of the delay time $t_{delay}$ by different amounts or in different ways in response to assertion of different ones of the adjuster inputs 382, 386, 390, 394. For example, the delay time $t_{delay}$ can be reset to zero or to a predetermined value or incremented or decremented by a predetermined amount in response to one or more of the adjuster inputs 382, 386, 390, 394.

The delay circuit 230 may further comprise a timeout comparator 384 configured to assert the first adjuster input 382 of the delay time adjustor 378 in response to the supply time interval $t_{IDSS}$ being greater than a predetermined on time $t_{IDSS(max)}$. The delay circuit 230 may further comprise a consumption monitor 388 configured to assert the second adjuster input 386 in response to the primary controller 120 being in a high-consumption mode, for example, where a number of drive clock DRV_clk pulses within a given time period exceeds a specific number. More specifically, the consumption monitor 388 may assert the second adjuster input 386 in response to the number of drive clock DRV_clk pulses within a HV period being greater than a predetermined margin value, where the HV period is the time period since the first current source 210 last began to drive the first electrical current $I_{DSS1}$.

Still referring to FIG. 3, the delay circuit 230 may further comprise an input amplitude sensor 392 configured to assert the third adjuster input 390 in response to an amplitude of the input voltage $V_{HV}$ varying by more than a predetermined amount over a predetermined time period. For example, the input amplitude sensor 392 may assert the third adjuster input 390 in response to the input voltage $V_{HV}$ varying in amplitude by more than an absolute value and/or by more than a predetermined percentage between subsequent HV periods. The delay circuit 230 may further comprise a valley absence sensor 396 configured to assert the fourth adjuster input 394 in response to passage of the supply time interval $t_{IDSS}$ from assertion of the first control input 216 of the first current source 210 until assertion of the voltage sensor output 274 of the control voltage sensor 270, and without occurrence of the third monitor output 288. In other words, the valley absence sensor 396 may assert the fourth adjuster input 394 in response to not detecting a valley during the supply time interval $t_{IDSS}$.

Figure 4:
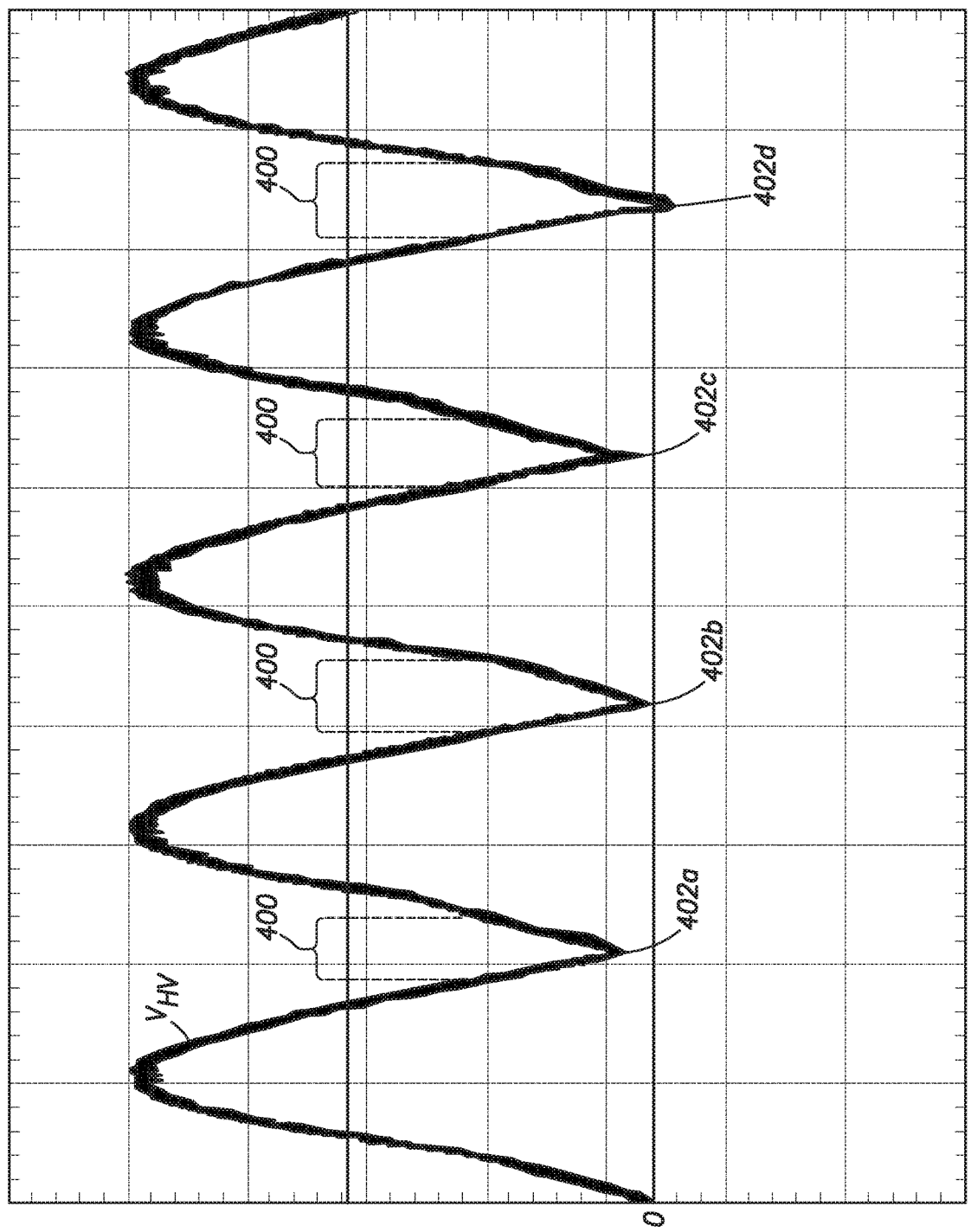
FIG. 4 shows a graph of voltages over time.

FIG. 4 shows a graph of voltages over time in accordance with at least some embodiments. More specifically, FIG. 4 illustrates a graph of the input voltage $V_{HV}$ of the power converter 100, with values that vary periodically to define valleys 400 as times about where the input voltage $V_{HV}$ is at a first local minimum 402a, a second local minimum 402b, a third local minimum 402c, and a fourth local minimum 402d. FIG. 4 illustrates a case where the input voltage $V_{HV}$ at the local minima 402 is irregular between periods. More specifically, the first local minimum 402a and the third local minimum 402c are each above 0V, the second local minimum 402b is about equal to 0V, and the fourth local minimum 402d is below the 0V line (i.e., it has a negative voltage value). This irregularity in the values of the input voltage $V_{HV}$ between local minima 402 may be generated from a combination of the first filter capacitors CY2, CY3 and the decoupler capacitor CY1, together with the relatively high impedance of the monitor terminal 126. This irregularity in the values of the input voltage $V_{HV}$ between local minima 402 may have detrimental effects. For example, this irregularity may make it difficult to detect a valley 400. In other words, because the input voltage $V_{HV}$ is not the same at different ones of the local minima 402, the time that the input voltage $V_{HV}$ reaches that local minima 402 may be difficult to detect.

Figure 5:
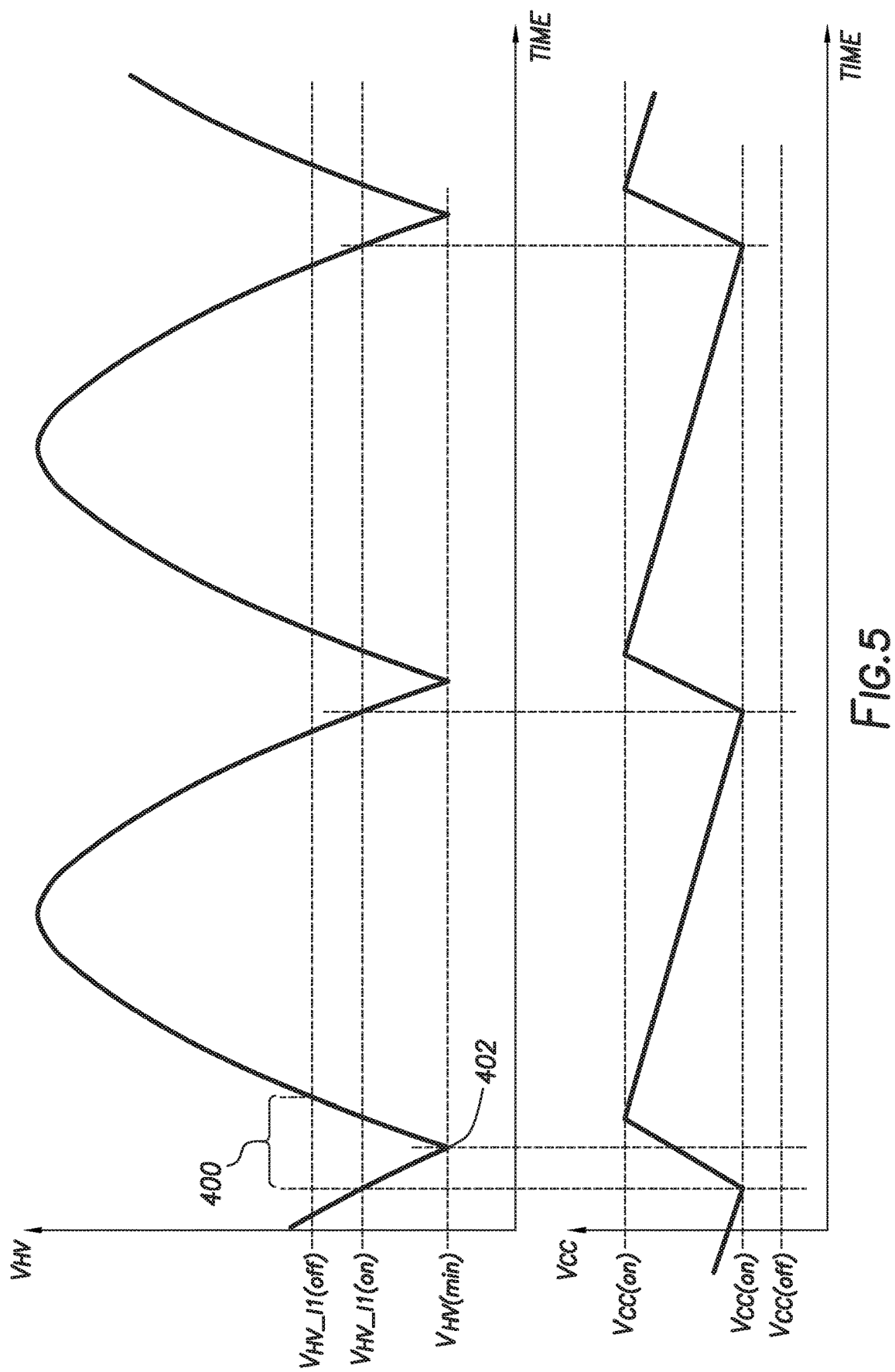
FIG. 5 shows a timing diagram in accordance with at least some embodiments.

FIG. 5 shows a timing diagram in accordance with at least some embodiments. In particular, FIG. 5 illustrates a graph of the input voltage $V_{HV}$ of the power converter 100, with values that vary periodically to define valleys 400 as times about where the input voltage $V_{HV}$ is at a local minimum 402 and where the input voltage $V_{HV}$ is equal to a reference voltage $V_{HV(min)}$. FIG. 5 also illustrates a graph of the control voltage $V_{CC}$ over the same time period.

As shown in FIG. 5, each valley 400 includes a steeply increasing control voltage $V_{CC}$ until the control voltage $V_{CC}$ reaches the first control voltage threshold $V_{CC(on)}$, at which time the control voltage $V_{CC}$ remains at the first control voltage threshold $V_{CC(on)}$ value until the input voltage $V_{HV}$ exceeds the first stop threshold voltage $V_{HV\_I1(off)}$, after which the control voltage $V_{CC}$ gradually decreases until the beginning of the next valley 400. The steeply increasing control voltage $V_{CC}$ is due to the control voltage capacitor C2 being charged by the first electrical current $I_{DSS1}$. Once the control voltage capacitor C2 is charged, the control voltage $V_{CC}$ may be kept at the first control voltage threshold $V_{CC(on)}$ with the first electrical current $I_{DSS1}$ still being driven from the monitor terminal 126 to the control voltage terminal 122.

Figure 6:
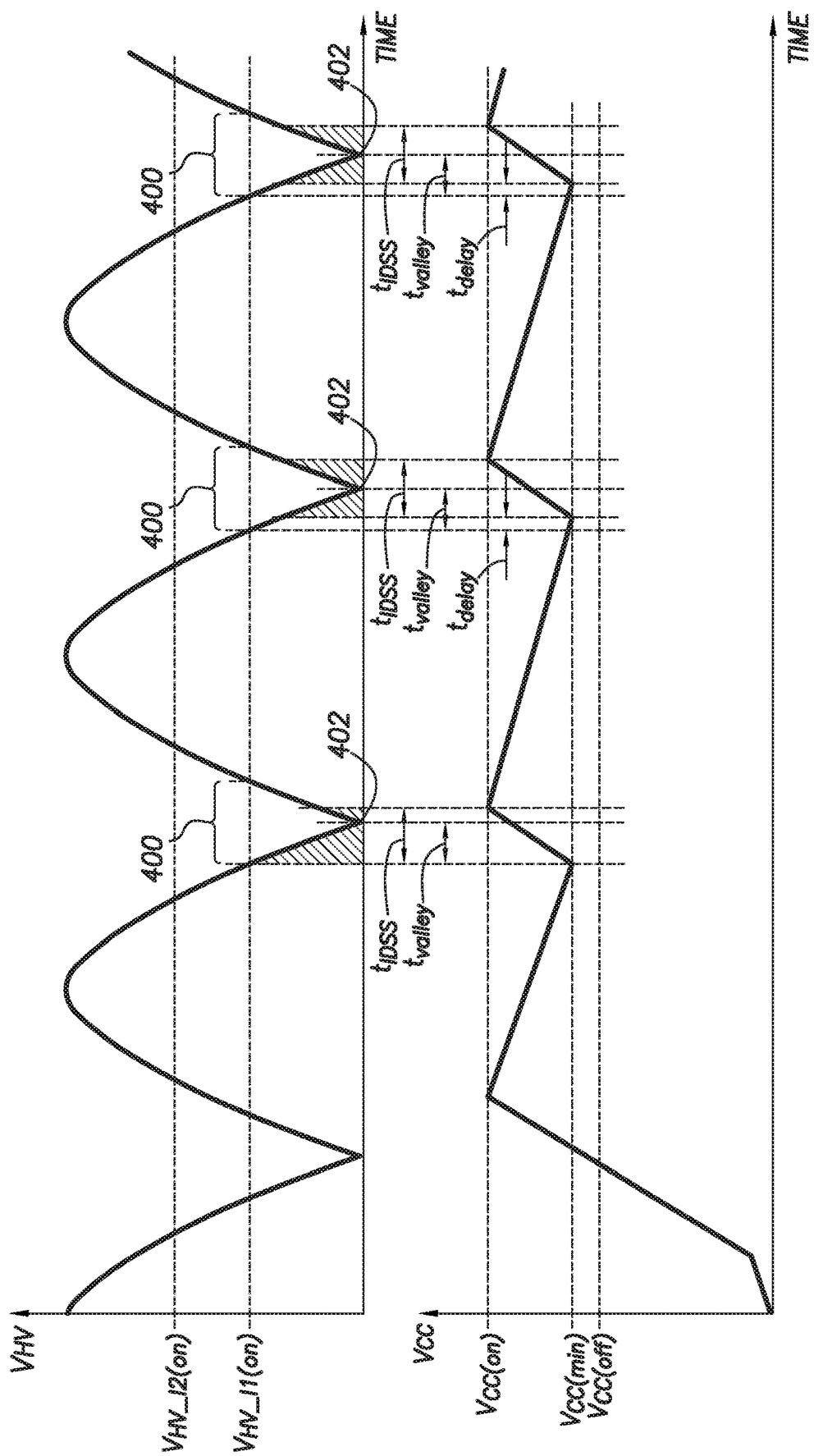
FIG. 6 shows a timing diagram in accordance with at least some embodiments.

FIG. 6 shows a timing diagram in accordance with at least some embodiments. In particular, FIG. 6 illustrates a graph of the input voltage $V_{HV}$ of the power converter 100, together with a graph of the control voltage $V_{CC}$ over the same time period.

FIG. 6 graphically illustrates several periods of the input voltage $V_{HV}$ of the power converter 100. The shaded regions below the input voltage $V_{HV}$ curve represent the time periods that the supplemental power controller 200 is actively charging the control voltage capacitor C2 (FIG. 1). More specifically, the shaded regions each represent a corresponding one of the supply time intervals $t_{IDSS}$, which begin when the first electrical current $I_{DSS1}$ starts to be driven from the monitor terminal 126 to the control voltage terminal 122 (FIG. 1). The shaded regions (and the corresponding supply time intervals $t_{IDSS}$) each end when the control voltage $V_{CC}$ reaches the first control voltage threshold $V_{CC(on)}$, at which point the control voltage $V_{CC}$ is held constant and the control voltage capacitor C2 is no longer charged.

In some example embodiments, and as illustrated in the first, or left-most valley 400 of in FIG. 6, the delay time $t_{delay}$ is initially set to zero, causing the supply time interval $t_{IDSS}$ to begin immediately when the input voltage $V_{HV}$ drops below the first start threshold voltage $V_{HV\_I1(on)}$. In subsequent valleys 400, the delay time $t_{delay}$ may be a non-zero amount of time, causing the supply time interval $t_{IDSS}$ to begin after the input voltage $V_{HV}$ drops below the first start threshold voltage $V_{HV\_I1(on)}$. In other words, the two valleys 400 shown on the right side of FIG. 6 illustrate the effect of the delay timer 240 to cause a delay in driving the first electrical current $I_{DSS1}$ from the monitor terminal 126 to the control voltage terminal 122 for a non-zero delay time $t_{delay}$ after the input voltage $V_{HV}$ drops below the first start threshold voltage $V_{HV\_I1(on)}$. This delay time $t_{delay}$ is used to center the supply time interval $t_{IDSS}$ within the valley 400 with about the same amount of time before and after the input voltage $V_{HV}$ is at the local minimum 402.

As also illustrated in FIG. 6, centering the supply time interval within the valley 400 may result in the first electrical current $I_{DSS1}$ being driven while the input voltage $V_{HV}$ is at about the local minimum 402. In other words, the first supply time interval $t_{IDSS}$ shown on FIG. 6 begins with the input voltage $V_{HV}$ at a higher voltage than the beginning input voltage $V_{HV}$ of subsequent supply time interval $t_{IDSS}$, which are centered within their respective valleys 400.

Centering the supply time interval $t_{IDSS}$ within the valley 400 may result in energy savings and an associated reduction in heat generation when compared to alternative solutions that provide electrical current from the monitor terminal 126 to the control voltage terminal 122 when the input voltage $V_{HV}$ is at higher voltages. Alternatively or additionally, centering the supply time interval within the valley 400 may result in a reduced impact on other circuitry within the primary controller 120 that may rely upon accurate measurement of the input voltage $V_{HV}$ on the monitor terminal 126, particularly at higher voltages. In other words, by centering the supply time interval $t_{IDSS}$ within the valley, effects on the input voltage $V_{HV}$ on the monitor terminal 126 as a result of the first electrical current $I_{DSS1}$ being driven from the monitor terminal 126 may be reduced, particularly when the input voltage $V_{HV}$ is at relatively high values.

In some embodiments, and as illustrated on FIG. 6, the primary controller 120 may be configured to stop driving the first electrical current $I_{DSS1}$ from the monitor terminal 126 to the control voltage terminal 122 in response to the input voltage $V_{HV}$ being greater than the first start threshold voltage $V_{HV\_I1(on)}$. This is an alternative to the conditions illustrated in FIG. 5 for stopping driving the first electrical current $I_{DSS1}$, in which the first electrical current $I_{DSS1}$ is driven until the input voltage $V_{HV}$ exceeds a first stop threshold voltage $V_{HV\_I1(off)}$, which is greater than the first start threshold voltage $V_{HV\_I1(on)}$.

As discussed above with reference to FIG. 2, the second current source 220 may be configured to drive the second electrical current $I_{DSS2}$ from the monitor terminal 126 to the control voltage terminal 122 in order to reduce the effective impedance of the monitor terminal 126 for reasons that are detailed below. The second current source 220 may be configured to drive the second electrical current $I_{DSS2}$ in response to the input voltage $V_{HV}$ being less than a second start threshold voltage $V_{HV\_I2(on)}$. In at least some embodiments, and as illustrated in the timing diagram of FIG. 6, the second start threshold voltage $V_{HV\_I2(on)}$ may be greater than the first start threshold voltage $V_{HV\_I1(on)}$.

More specifically, the second electrical current $I_{DSS2}$ may reduce the effective impedance of the monitor terminal 126 around the time that the input voltage $V_{HV}$ is in a valley 400. The reduced impedance of the monitor terminal 126 thereby limits the fluctuation of the input voltage $V_{HV}$ on the monitor terminal 126. In other words, the reduced impedance of the monitor terminal 126 stabilizes the input voltage $V_{HV}$. The stabilized input voltage $V_{HV}$ enables the primary controller 120 to detect a valley 400 as a time about where the input voltage $V_{HV}$ is at a local minimum 402 using a comparator to determine the input voltage $V_{HV}$ being less than a reference voltage $V_{HV(min)}$. The stabilized input voltage $V_{HV}$ also enables the primary controller 120 to detect the input voltage $V_{HV}$ being less than the first start threshold voltage $V_{HV\_I1\ (on)}$ with greater precision than would be the case in an alternative design without the second electrical current $I_{DSS2}$ and the reduced effective impedance of the monitor terminal 126 resulting from the second electrical current $I_{DSS2}$.

The second electrical current $I_{DSS2}$ from the monitor terminal 126 to the control voltage terminal 122, driven when the input voltage $V_{HV}$ is less than the second start threshold voltage $V_{HV\_I2(on)}$, as described above, provides efficiency advantages when compared with an alternative of configuring the monitor terminal 126 to have the reduced impedance all the time. By causing the monitor terminal 126 to have a relatively higher impedance with the input voltage $V_{HV}$ being relatively high (e.g. with the input voltage $V_{HV}$ being above the second start threshold voltage $V_{HV\_I2(on)}$), energy consumption and waste heat generation may be reduced.

Furthermore, the second electrical current $I_{DSS2}$ from the monitor terminal 126 to the control voltage terminal 122, and which is driven with the input voltage $V_{HV}$ less than the second start threshold voltage $V_{HV\_I2(on)}$, may provide additional advantages. For example, the control voltage terminal 122 may not need to withstand the higher voltage levels that may be present on the monitor terminal 126 if the second electrical current $I_{DSS2}$ were driven when the input voltage $V_{HV}$ was substantially higher, such as when the input voltage $V_{HV}$ is greater than the second start threshold voltage $V_{HV\_I2(on)}$. The control voltage terminal 122 may, therefore, have a less costly construction than if it had to withstand higher voltages. For example, using the above-described method, the control voltage terminal 122 may be constructed using a silicon process rated for 40 Volts, where an alternative design that always supplied current from the monitor terminal 126, may require the control voltage terminal 122 to be constructed using a more costly process capable of higher voltages such as, for example, 80 Volts.

Figure 7:
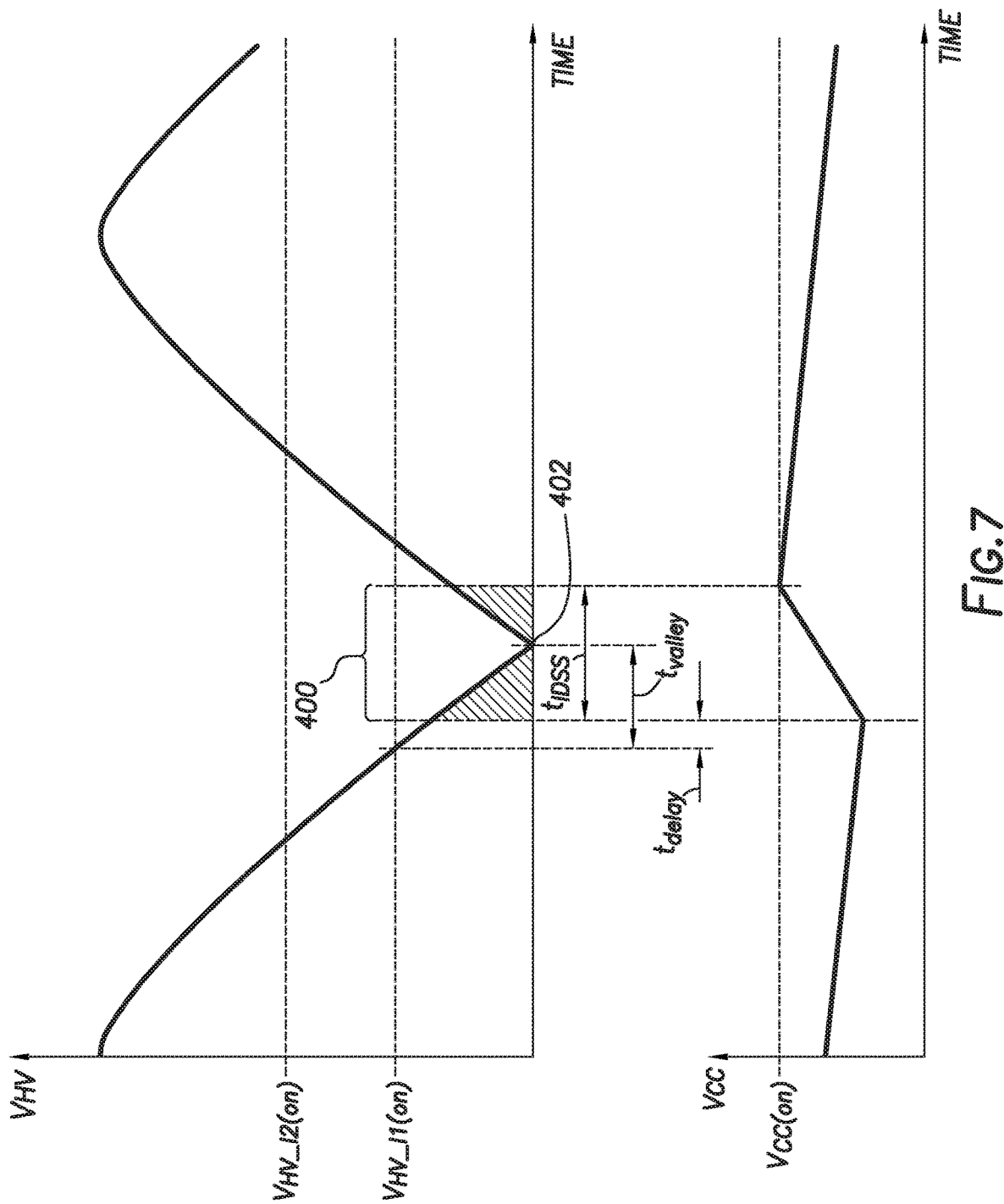
FIG. 7 shows a timing diagram in accordance with at least some embodiments.

FIG. 7 shows a timing diagram in accordance with at least some embodiments. In particular, FIG. 7 is an enlarged portion of FIG. 6, illustrating the supply time interval $t_{IDSS}$ while the first electrical current $I_{DSS1}$ is driven and while the control voltage $V_{CC}$ is less than the first control voltage threshold $V_{CC(on)}$, and which is centered within the valley 400 with about the same amount of time before and after the input voltage $V_{HV}$ is at the local minimum 402. In other words, FIG. 7 shows the effect of the delay timer 240 set with the delay time $t_{delay}$ equal to the valley time $t_{valley}$ minus one-half of the supply time interval $t_{IDSS}$ to center the supply time interval $t_{IDSS}$ within the valley 400.

In accordance with at least some embodiments, the delay time $t_{delay}$ may be adjusted in response to one or more different conditions. The adjustment may take the form of resetting the delay time $t_{delay}$ to zero or to a predetermined value. Alternatively or additionally, the adjustment may take the form of incrementing or decrementing the delay time $t_{delay}$. Different types of adjustment may be used in response to different ones of the conditions.

In accordance with at least some embodiments, the delay time $t_{delay}$ may be adjusted in response to the first electrical current $I_{DSS1}$ being driven for longer than a predetermined on time $t_{IDSS(max)}$. This condition may provide protection against overheating in case the control voltage capacitor C2 does not fully charge by the first electrical current $I_{DSS1}$ or if the first electrical current $I_{DSS1}$ fails to turn off, for example, if the first electrical current $I_{DSS1}$ remains on with the input voltage $V_{HV}$ exceeding first stop threshold voltage $V_{HV\_I1(off)}$. In other words, the delay time $t_{delay}$ may be adjusted in response to a failure of the turn-off comparison that should cause the first electrical current $I_{DSS1}$ to be stopped.

In accordance with at least some embodiments, the delay time $t_{delay}$ may be adjusted in response to the primary controller 120 being in a high-consumption mode. The high-consumption mode may exist, for example, where the primary controller 120 executes a number of drive clock DRV_clk pulses greater than a predetermined margin value within a HV period, where the HV period is the time period since the second current source 220 last began to drive the first electrical current $I_{DSS1}$.

In accordance with at least some embodiments, the delay time $t_{delay}$ may be adjusted in response to a variation of an amplitude of the input voltage $V_{HV}$ by more than a predetermined amount over a predetermined time period.

In accordance with at least some embodiments, the delay time $t_{delay}$ may be adjusted in response to the input voltage $V_{HV}$ being greater than the reference voltage $V_{HV(min)}$ throughout a supply time interval $t_{IDSS}$ while the control voltage capacitor C2 is charged by the first electrical current $I_{DSS1}$. In other words, the delay time $t_{delay}$ may be adjusted in response to not detecting a valley 400 during a supply time interval $t_{IDSS}$.

Figure 8:
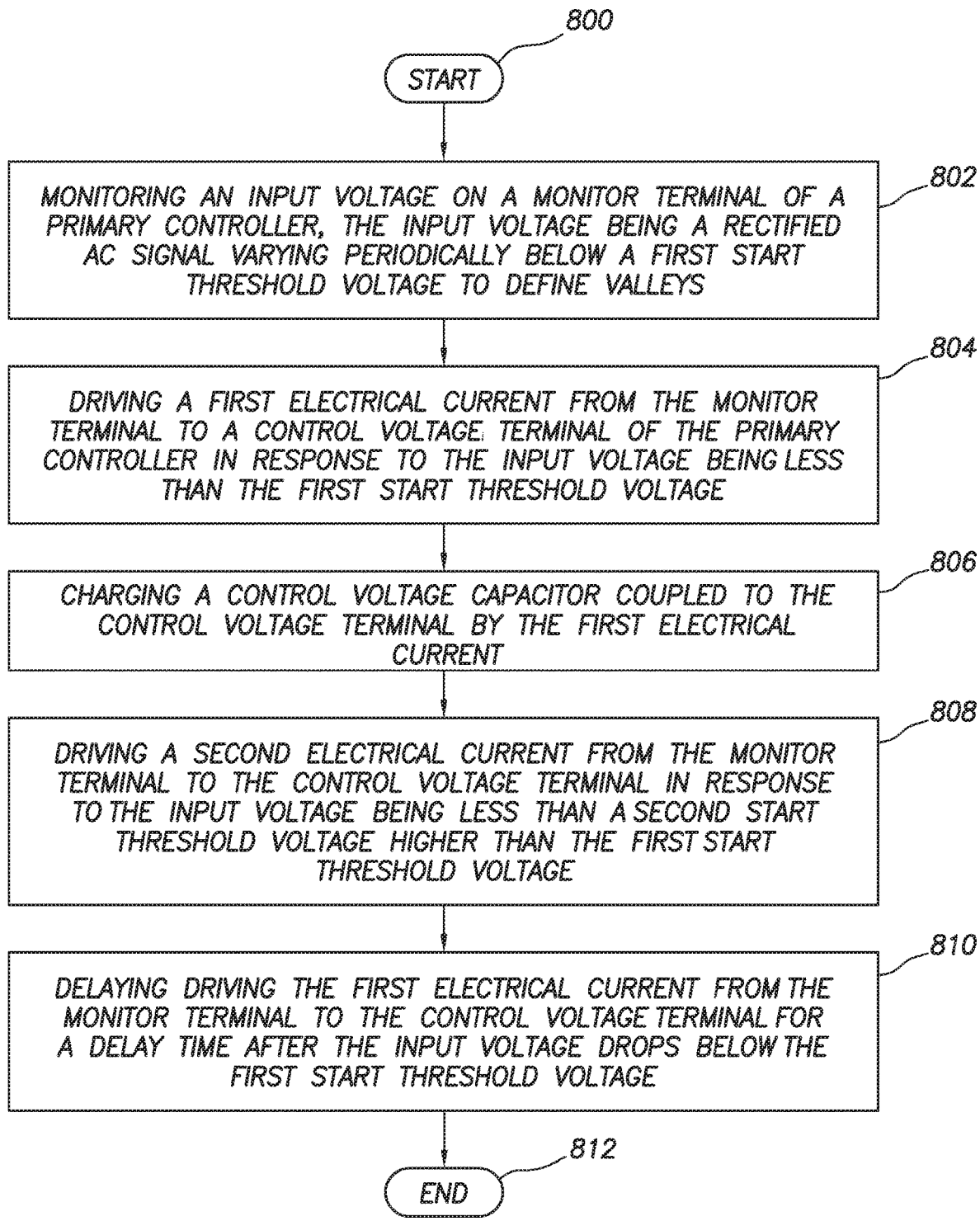
FIG. 8 shows method steps in accordance with at least some embodiments.

FIG. 8 shows a method in accordance with at least some embodiments. In particular, the method starts (block 800) and comprises: monitoring an input voltage on a monitor terminal of a primary controller, the input voltage being a rectified AC signal varying periodically below a first start threshold voltage to define valleys; (block 802); driving a first electrical current from the monitor terminal to a control voltage terminal of the primary controller in response to the input voltage being less than the first start threshold voltage (block 804); charging a control voltage capacitor coupled to the control voltage terminal by the first electrical current (block 806); driving a second electrical current, less than the first electrical current, from the monitor terminal to the control voltage terminal in response to the input voltage being less than a second start threshold voltage higher than the first start threshold voltage (block 808); and delaying driving the first electrical current from the monitor terminal to the control voltage terminal for a delay time after the input voltage drops below the first start threshold voltage (block 810); Thereafter the method ends (block 812).

In some embodiments, the step of delaying driving the first electrical current from the monitor terminal to the control voltage terminal for a delay time after the input voltage drops below the first start threshold voltage (block 810) further includes: determining a valley time as the length of time from the input voltage dropping below the first start threshold voltage until the input voltage is less than a reference voltage; recording an amount of time that the control voltage capacitor is charged by the first electrical current as a supply time interval; and calculating the delay time as the valley time minus one-half of the supply time interval. In other words, the delay time $t_{delay}$ may be calculated according to the following formula: $t_{delay} = t_{valley} - t_{IDSS}/2$. A graphic example of this embodiment is shown in the timing diagram on FIG. 6.

In some embodiments, the step of delaying driving the first electrical current from the monitor terminal to the control voltage terminal for a delay time after the input voltage drops below the first start threshold voltage (block 810) further includes: adjusting the delay time in response to the first electrical current being driven for longer than a predetermined time. For example, the delay time can be reset to zero or to a predetermined value or incremented or decremented by a predetermined amount.

In some embodiments, the step of delaying driving the first electrical current from the monitor terminal to the control voltage terminal for a delay time after the input voltage drops below the first start threshold voltage (block 810) further includes: determining the primary controller being in a high-consumption mode; and adjusting the delay time in response to the primary controller being in the high-consumption mode. For example, the delay time can be reset to zero or to a predetermined value or incremented or decremented by a predetermined amount. The primary controller may be determined to be in the high-consumption mode, for example, if a number of drive clock pulses exceeds a predetermined margin value with a given period of time. For example, if the number of drive pulses is greater than the predetermined margin value within a HV period since a previous start time of driving the first electrical current from the monitor terminal to a control voltage terminal of the primary controller.

In some embodiments, the step of delaying driving the first electrical current from the monitor terminal to the control voltage terminal for a delay time after the input voltage drops below the first start threshold voltage (block 810) further includes: detecting a variation in an amplitude of the input voltage by more than a predetermined amount over a predetermined time period; and adjusting the delay time in response to a variation in the amplitude of the input voltage. For example, the delay time can be reset to zero or to a predetermined value or incremented or decremented by a predetermined amount.

In some embodiments, the step of delaying driving the first electrical current from the monitor terminal to the control voltage terminal for a delay time after the input voltage drops below the first start threshold voltage (block 810) further includes: recording an amount of time that the control voltage capacitor is charged by the first electrical current (i.e. the period of time that block 806 is active) as a supply time interval; and adjusting the delay time in response to the input voltage being greater than the reference voltage throughout the supply time interval. For example, the delay time can be reset to zero or to a predetermined value or incremented or decremented by a predetermined amount. In other words, the delay time may be reset or otherwise adjusted in response to not detecting a valley during the supply time interval. In one embodiment, the step of adjusting the delay time includes increasing the delay time by a supply time interval $t_{IDSS}$ of a previous period. In other words, the delay time $t_{delay}(n)$ may be set according to the following formula: $t_{delay}(n) = t_{delay}(n-1) + t_{IDSS}(n-1)/2$, where n is a number of a given period within a regularly repeating cycle, such as the HV period of the input voltage $V_{HV}$.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, comprising:
    monitoring an input voltage on a monitor terminal of a primary controller, the input voltage being a rectified AC signal varying periodically below a first start threshold voltage to define valleys;
    driving a first electrical current from the monitor terminal to a control voltage terminal of the primary controller in response to the input voltage being less than the first start threshold voltage; and
    charging a control voltage capacitor coupled to the control voltage terminal by the first electrical current.

2. The method of claim 1, further comprising:
    driving a second electrical current from the monitor terminal to the control voltage terminal in response to the input voltage being less than a second start threshold voltage higher than the first start threshold voltage; and
    wherein the second electrical current is less than the first electrical current.

3. The method of claim 1, further comprising:
    delaying driving the first electrical current from the monitor terminal to the control voltage terminal for a delay time after the input voltage drops below the first start threshold voltage.

4. The method of claim 3, wherein delaying driving the first electrical current from the monitor terminal to the control voltage terminal further comprises:
    determining a valley time as the length of time from the input voltage dropping below the first start threshold voltage until the input voltage is less than a reference voltage;
    recording an amount of time that the control voltage capacitor is charged by the first electrical current as a supply time interval; and calculating the delay time as the valley time minus one-half of the supply time interval.

5. The method of claim 3, further comprising:
adjusting the delay time in response to the first electrical current being driven for longer than a predetermined time.

6. The method of claim 3, further comprising:
determining the primary controller being in a high-consumption mode; and
adjusting the delay time in response to the primary controller being in the high-consumption mode.

7. The method of claim 3, further comprising:
detecting a variation in an amplitude of the input voltage by more than a predetermined amount over a predetermined time period; and
adjusting the delay time in response to a variation in the amplitude of the input voltage.

8. The method of claim 3, further comprising:
recording an amount of time that the control voltage capacitor is charged by the first electrical current as a supply time interval; and
adjusting the delay time in response to the input voltage being greater than the reference voltage throughout the supply time interval.

9. The method of claim 8, wherein adjusting the delay time further comprises increasing the delay time by the supply time interval.

10. A power converter comprising:
a primary side comprising:
an AC input including a line terminal and a neutral terminal for receiving an AC input power;
an input rectifier to provide a rectified AC power to an input sensing node with the rectified AC power having an input voltage varying periodically below a first start threshold voltage to define valleys;
a primary winding of a transformer;
an auxiliary winding of the transformer;
a primary controller defining a control voltage terminal, and a monitor terminal, the control voltage terminal coupled to a control voltage capacitor and to the auxiliary winding of the transformer, and the monitor terminal coupled to the input sensing node;
wherein the primary controller is configured to:
drive a first electrical current from the monitor terminal to the control voltage terminal in response to the input voltage being less than the first start threshold voltage; and
charge the control voltage capacitor by the first electrical current.

11. The power converter of claim 10, wherein the primary controller is further configured to drive a second electrical current from the monitor terminal to the control voltage terminal in response to the input voltage being less than a second start threshold voltage, with the second electrical current less than the first electrical current.

12. The power converter of claim 10, further comprising:
a delay timer configured to delay driving the first electrical current from the monitor terminal to the control voltage terminal for a delay time after the input voltage drops below the first start threshold voltage.

13. The power converter of claim 12, further comprising:
a valley timer configured to determine a valley time as the length of time from the input voltage dropping below the first start threshold voltage until the input voltage is less than a reference voltage;
a switched supply timer configured to record an amount of time that the control voltage capacitor is charged by the first electrical current as a supply time interval; and
wherein the delay time is the valley time minus one-half of the supply time interval.

14. The power converter of claim 12, wherein the delay time is adjusted in response to at least one of: the first electrical current being driven for longer than a predetermined on time, or the primary controller being in a high-consumption mode, or a variation of an amplitude of the input voltage by more than a predetermined amount over a predetermined time period, or the input voltage being greater than the reference voltage throughout a supply time interval while the control voltage capacitor is charged by the first electrical current.

15. A primary controller for a power converter, comprising:
a control voltage terminal;
a monitor terminal; and
a supplemental power controller comprising:
a monitor circuit defining a monitor input and a first control output, the monitor input coupled to the monitor terminal, the monitor circuit configured to measure an input voltage on the monitor terminal, and to assert the first control output when the input voltage is less than a first start threshold voltage; and
a first current source defining a first current input, a first current output, and a first control input, the first current input coupled to the monitor terminal, the first current output coupled to the control voltage terminal, and the first control input coupled to the first control output, the first current source configured to drive a first electrical current from the monitor terminal to the control voltage terminal in response to assertion of the first control input.

16. The primary controller of claim 15, wherein the supplemental power controller further comprises:
the monitor circuit defining a second control output, the monitor circuit configured to assert the second control output when the input voltage is less than a second start threshold voltage higher than the first start threshold voltage; and
a second current source defining a second current input, a second current output, and a second control input, the second current input coupled to the monitor terminal, the second current output coupled to the control voltage terminal, and the second control input coupled to the second control output, the second current source configured to drive a second electrical current from the monitor terminal to the control voltage terminal in response to assertion of the second control input, with the second electrical current being less than the first electrical current.

17. The primary controller of claim 15, wherein the supplemental power controller further comprises:
a delay timer configured to delay assertion of the first control input of the first current source for a delay time after the monitor circuit asserts the first control output.

18. The primary controller of claim 17, wherein the supplemental power controller further comprises:
a control voltage sensor defining a sensor input and a sensor output, the sensor input coupled to the control voltage terminal, the control voltage sensor configured to measure a control voltage on the control voltage terminal and to assert the sensor output when the control voltage is greater than a first control voltage threshold;

the monitor circuit defining a third control output, the monitor circuit configured to assert the third control output when the input voltage is less than a reference voltage;

a valley timer configured to determine a valley time as the length of time from when the monitor circuit asserts the first control output until the monitor circuit asserts the third control output;

a switched supply timer configured to record a supply time interval from assertion of the first control input of the first current source until the sensor output of the control voltage sensor; and wherein the delay time is the valley time minus one-half of the supply time interval.

19. The primary controller of claim 17, wherein the supplemental power controller further comprises:

a delay time adjustor configured to change the length of the delay time between assertion of the first control input of the first current source after the monitor circuit asserts the first control output;

wherein the primary controller further comprises at least one of:

a timeout comparator defining a timeout output, the timeout comparator configured to assert the timeout output in response to the supply time interval being greater than a predetermined on time;

a consumption monitor defining a consumption output, the consumption monitor configured to assert the consumption output with the primary controller being in a high-consumption mode; or an input amplitude sensor defining an amplitude variation output, the input amplitude sensor configured to assert the amplitude variation output in response to an amplitude of the input voltage varying by more than a predetermined amount over a predetermined time period;

a valley absence sensor defining a valley absence output, the valley absence sensor configured to assert the valley absence output in response to passage of the supply time interval from assertion of the first control input of the first current source until the sensor output of the control voltage sensor, and without occurrence of the third control output; and wherein the delay time adjustor is configured to change the length of the delay time in response to at least one of: the timeout output, or the consumption output, or the amplitude variation output, or the valley absence output.

* * * * *